United States Patent
Ehret et al.

(10) Patent No.: US 7,492,313 B1
(45) Date of Patent: Feb. 17, 2009

(54) DIGITAL PROCESSING RADAR SYSTEM

(75) Inventors: Timothy Ehret, Medford, NJ (US); Francis Xavier McGroary, Brick, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 73 days.

(21) Appl. No.: 11/590,402

(22) Filed: Oct. 31, 2006

(51) Int. Cl.
*G01S 7/28* (2006.01)

(52) U.S. Cl. .................... 342/175; 342/82; 342/158; 342/368

(58) Field of Classification Search ................ 342/175, 342/82, 158, 200–202, 368, 371, 372
See application file for complete search history.

(56) References Cited

U.S. PATENT DOCUMENTS

| | | | |
|---|---|---|---|
| 4,641,107 A | 2/1987 | Kalokitis | |
| 4,780,685 A | 10/1988 | Ferguson | |
| 4,885,590 A | 12/1989 | Hasan | |
| 4,965,530 A | 10/1990 | Katz | |
| 5,017,927 A | 5/1991 | Agrawal et al. | |
| 5,103,233 A | 4/1992 | Gallagher et al. | |
| 5,151,702 A | 9/1992 | Urkowitz | |
| 5,157,403 A | 10/1992 | Urkowitz | |
| 5,309,161 A | 5/1994 | Urkowitz et al. | |
| 5,343,208 A | 8/1994 | Chesley | |
| 5,376,939 A | 12/1994 | Urkowitz | |
| 5,414,428 A | 5/1995 | Gallagher et al. | |
| 5,440,311 A | 8/1995 | Gallagher et al. | |
| 5,481,270 A | 1/1996 | Urkowitz et al. | |
| 6,084,540 A | 7/2000 | Yu | |
| 6,184,820 B1 | 2/2001 | Kratzer | |
| 6,469,671 B1 | 10/2002 | Pluymers et al. | |
| 6,483,478 B2 | 11/2002 | Yu | |
| 6,639,546 B1 | 10/2003 | Ott et al. | |
| 6,861,974 B1 | 3/2005 | Poe et al. | |
| 6,995,638 B1 | 2/2006 | Smith et al. | |
| 7,076,201 B2 * | 7/2006 | Ammar | 455/3.02 |
| 7,081,848 B1 | 7/2006 | Adams | |
| 7,345,629 B2 * | 3/2008 | Dulmovits et al. | 342/372 |
| 7,355,547 B2 * | 4/2008 | Nakazawa et al. | 342/70 |
| 2002/0030250 A1 * | 3/2002 | Ammar | 257/664 |

(Continued)

OTHER PUBLICATIONS

Skolnik, Merril (of the Naval Research Library), "Attributes of the Ubiquitous Phased Array Radar", published 2003 by the IEEE.

*Primary Examiner*—John B Sotomayor
(74) *Attorney, Agent, or Firm*—Duane Morris LLP

(57) ABSTRACT

A radar system array antenna includes plural elements. Each element is coupled to a port of a transmit-receive device. Digital data representing the characteristics of the radar signal is applied to a monolithic IC combination DAC/ADC, which converts the digital data into analog transmit signal. The analog transmit signal is applied to a monolithic microwave IC transceiver, which may be monolithic with the DAC/ADC. The transceiver upconverts the transmit signal. The upconverted transmit signal is applied to a transmit port of the transmit-receive device and transmitted. Receive RF signal is coupled from each antenna element through the transmit-receive device to a receive signal port of the transceiver. The transceiver downconverts the receive signal to produce received downconverted signal. The downconverted signal is coupled to the ADC part of the DAC/ADC, which converts to receive digital signal. Digital processing processes the receive digital signal to produce the return target information.

18 Claims, 5 Drawing Sheets

U.S. PATENT DOCUMENTS

| | | |
|---|---|---|
| 2002/0030269 A1* | 3/2002 | Ammar ................. 257/704 |
| 2002/0055349 A1* | 5/2002 | Ammar ................. 455/342 |
| 2004/0212084 A1* | 10/2004 | Ammar ................. 257/728 |
| 2006/0135103 A1* | 6/2006 | Ammar ................. 455/232.1 |
| 2008/0117097 A1* | 5/2008 | Walter et al. ................. 342/175 |

* cited by examiner

DIGITAL PROCESSING RADAR SYSTEM

FIELD OF THE INVENTION

This invention relates to radar systems, and more particularly to radar systems in which digital processing is coupled by a transceiver to each element of an array antenna.

BACKGROUND OF THE INVENTION

Radar systems are widely known. Early radar systems used vacuum tubes in analog circuits, and were subject to reliability problems. In particular, the vacuum tubes would age with time, and the operating parameters of the radar system would vary on an almost continuous basis, requiring constant realignment. When left in operation, the many vacuum tubes of a radar system would give rise to frequent failures attributable to normal aging and often excessive heat. If turned off when not in use, the thermal cycling would often result in tube failures at each turn-on, requiring trouble-shooting and maintenance.

With the advent of solid-state devices, some of the low-frequency, low-power functions of a radar system could be converted away from tubes. This often provided a major improvement in reliability. The introduction of integrated circuits gave impetus for their use in the low-frequency, low-power sections of a radar system, and also gave impetus to the nascent field of digital signal processing.

Digital signal processing gained dominance in the field of radar signal processing, and advanced or special-purpose integrated circuits were developed to handle high frequencies. Solid-state devices have been limited, however, in their ability to handle the large amounts of power required for radar transmissions. This problem has been partially solved by dividing the power to be transmitted among a plurality of solid-state amplifiers, each of which provides transmit power to one or a few antenna elements of an active array antenna. Examples of such solid-state amplifiers appear in U.S. Pat. Nos. [4,601,106] and 4,641,107, issued Feb. 3, 1987 to Kalokitis; 4,780,685 issued Oct. 25, 1988 to Ferguson; and 4,965,530 issued Oct. 23, 1990 to Katz. Solid-state amplifiers are often found embedded within transmit-receive (T/R) modules. Such TR modules are described, for example, in U.S. Pat. No. 5,017,927, issued May 21, 1991 to Agrawal et al. The use of many such these T/R modules in a limited space gives rise to heat removal or temperature problems, and an art, exemplified by U.S. Pat. No. 6,469,671, issued Oct. 22, 2002 to Pluymers et al., has arisen to configure such systems for convenient heat removal.

The design of radar systems involves a complex tradeoff among many factors, among which are system complexity, cost, weight, performance, and reliability. Some of the problems, issues and considerations challenging the design of radars in various contexts are described or addressed in many publications, as for example in U.S. Pat. Nos. 4,885,590 issued Dec. 5, 1989 to Hasan; 5,103,233 issued Apr. 7, 1992 to Gallagher et al.; 5,151,702, issued Sep. 29, 1992 to Urkowitz; 5,157,403 issued Oct. 20, 1992 to Urkowitz; 5,309,161 issued May 3, 1994 to Urkowitz et al.; 5,343,208 issued Aug. 30, 1994 in the name of Chesley; 5,376,939 issued Dec. 27, 1994 to Urkowitz; 5,414,428 issued May 9, 1995 to Gallagher et al.; 5,440,311 issued Aug. 8, 1995 to Gallagher et al.; 5,481,270 issued Jan. 2, 1996 to Urkowitz et al.; 6,084,540 issued Jul. 4, 2000 to Yu; 6,184,820 issued Feb. 6, 2001 to Kratzer; 6,483,478 issued Nov. 19, 2002 to Yu; 6,639,546 issued Oct. 28, 2003 to Ott et al.; 7,081,848 issued Jul. 25, 2006 to Adams; and 6,861,974 issued Mar. 1, 2005 to Poe et al. The problems associated with radar system design are more numerous and complex than might be thought. As an example of problems which are not signal processing problems, U.S. Pat. No. 6,995,638, issued Feb. 7, 2006 in the name of Smith et al. describes a structural augmentation arrangement which is intended to aid in maintaining reliability attributable to physical flexure or movement between a transmitter and an associated antenna. Among other problems associated with radar system design are that the beamformers, circulators (if any), T/R modules, and filters (if any) associated with each elemental antenna of the antenna array tend to be physically large. It is very desirable to be able to set the inter-antenna-element spacing based on operational factors such as operating frequency, beam width, sidelobe level, grating lobes, and the like. The large size of the T/R modules tends to make selection of an appropriate inter-antenna-element spacing difficult. This problem has been addressed by selecting an appropriate inter-antenna-element spacing, and in a related fashion, by feeding groups of antenna elements in common.

Currently the most advanced radar systems rely on a plurality of array elements with associated T/R modules. Each T/R module includes circuitry that provides an analog modulation of an RF signal's phase characteristics. Each T/R module includes circuitry that provides an analog modulation of an RF signal's amplitude characteristics. After these modulations are performed, an RF beamformer is required to sum the module's individual signals to form a beam with directional gain. These analog modulation devices and analog beamformers are expensive, require considerable space, and must be cooled. If multiple simultaneous beams are required, a plurality of these circuits is needed in the same space, compounding the shortcomings of the architecture. Additionally, to control these analog circuits, multi-bit digital control signals must be sent to each circuit at a specified rate. This requires a computational source to generate the signals and a network to distribute them in a timely manner.

Improved or alternative radar systems are desired.

SUMMARY OF THE INVENTION

A radar system according to an aspect of the invention comprises a first plurality of arrayed elemental antennas forming an array and a plurality, equal in number to the first plurality, of digital transmitting signal generating means. The radar system also includes a plurality, equal in number to the first plurality, of receive digital signal processing means and a plurality, equal in number to the first plurality, of monolithic mixed-signal integrated circuit (MMIC) combination digital-to-analog and analog-to-digital conversion means, each digital-to-analog conversion means (DAC) including a digital input port and an analog output port, and each analog-to-digital conversion means (ADC) including an analog input port and a digital output port. The radar system further includes a plurality, equal in number to the first plurality, of monolithic microwave integrated circuit (MMIC) transceivers, each of the MMIC transceivers including (a) a transmit analog signal input port coupled to an upconverter for upconverting analog signals to be transmitted, a transmit amplifier coupled to the upconverter for receiving upconverted signals to be transmitted and for generating at an analog transmit signal output port analog signals to be transmitted and (b) an analog receive signal input port coupled to a receive amplifier for generating amplified receive signals, and a downconverter coupled for receiving the amplified receive signals, for generating at an analog receive signal output port downconverted analog receive signals. The radar system also includes means for coupling each of the digital transmitting signal generating means to the digital input port of a corresponding one of the digital-to-analog conversion means, whereby analog transmit signals appear at the analog output port of the digital-to-analog conversion means. Means are provided for coupling the analog output port of each of the digital-to-analog conversion means to the analog transmit signal input port of a corresponding one of the transceivers, whereby analog signals to be transmitted are generated at the analog transmit signal output port. A plurality, equal in number to the first plurality, of transmit-receive switches are provided. Each of the switches includes a common port and also includes individual transmit and receive ports, with the common port of each of the transmit-receive switches being coupled to a corresponding elemental antenna of the array. The radar system further includes means for coupling the analog transmit signal output port of each of the transceivers to a corresponding transmit port of a corresponding one of the switches, whereby, when the corresponding one of the switches is conditioned for transmission, coupling the analog signals to be transmitted from the analog transmit signal output port of the corresponding transceiver to the corresponding elemental antenna of the array. Means are provided for coupling the receive signal port of each of the transmit-receive switches to the analog receive signal input port of the corresponding one of the transceivers, thereby, when the corresponding one of the switches is conditioned for reception, coupling receive signals from the corresponding one of the elemental antennas to the analog receive signal output port of the corresponding one of the transceivers. Means are also provided for coupling the analog receive signal output port of the corresponding one of the transceivers to the analog input port of the corresponding one of the combination digital-to-analog and analog-to-digital conversion means, whereby digital receive signals are generated at the digital output port of the combination digital-to-analog and analog-to-digital conversion means. Means are further provided for coupling the digital output port of the combination digital-to-analog and analog-to-digital conversion means to the receive digital signal processing means. Radar control means are coupled to the digital transmitting signal generating means, to the receive digital signal processing means, and to the switches, for controlling the digital transmitting signal generating means for generating transmit signals during those intervals in which the switch means are conditioned for transmission, and for controlling the digital signal processing means during those intervals in which the switch means are conditioned for reception.

In a particular embodiment of this system, the common port of each of the transmit-receive switches is coupled to a corresponding elemental antenna of the array by means of a filter, which may be a bandpass filter. In an especially advantageous version or arrangement according to an aspect of the invention, each of the transceivers conforms to at least single-band IEEE 802-11 WLAN standards. In another advantageous version, each of the transceivers conforms to dual-band 802.11a/g standards at 2.4 to 2.5 GHz and 4.9 to 5.87 GHz.

A radar system according to another aspect of the invention comprises an array including a first plurality of antenna elements, and a plurality, equal in number to the first plurality, of transmit-receive means, each of the transmit-receive means including a common port and first and second individual ports, the common port of each of the transmit-receive means being coupled to an associated antenna element of the array of antenna elements. The transmit-receive means may be a controllable switch or a circulator. In this system, a plurality, equal in number to the first plurality, of COTS MMIC transceivers are provided, each of the transceivers comprising a transmit channel, a receive channel, and a transmit-frequency oscillator for producing transmit-frequency signals. The transmit channel comprises I and Q transmit modulators defining I and Q input ports, each of the I and Q transmit modulators being coupled to receive mutually-quadrature-phase versions of the transmit-frequency signals at the input ports of the I and Q transmit modulators, for generating upconverted I and Q transmit signals at the transmit frequency. The transmit channel further comprises a transmit amplifier coupled to output ports of the transmit I and Q modulators for generating amplified transmit signals. The transmit amplifier may be differential. The receive channel comprises a receive amplifier and receive I and Q modulators. Each of the receive I and Q modulators includes an input port coupled to the receive amplifier for receiving amplified receive signal therefrom. Each of the receive I and Q modulators is coupled to receive mutually-quadrature-phase versions of the transmit-frequency signals for generating downconverted I and Q receive signals at output ports of the receive I and Q modulators. The receive channel further includes amplifying means for amplifying the downconverted I and Q receive signals. A plurality, equal in number to the first plurality, of COTS MMIC power amplifiers is provided, each of the power amplifiers including an input port coupled to the output port of the transmit amplifier of an associated one of the transceivers and an output port coupled to the first individual port of an associated one of the transmit-receive means. Coupling means are coupled to the second individual port of an associated one of the transmit-receive means and to the input port of the receive amplifier, for coupling analog received signal to the receive amplifier. A plurality, equal in number to the first plurality, of COTS MMIC combination digital/analog converters are provided. Each of the combination digital/analog converters includes digital-to-analog (DAC) converters coupled to receive digital control signals, for converting the digital control signals into corresponding analog I and Q modulation signals. Each of the combination digital/analog converters further includes analog-to-digital conversion means (ADCs), for converting applied analog I and Q signals into corresponding digital signals. Coupling means interconnect the digital-to-analog converters (DACs) of each of the combination digital/analog converters with the transmit I and Q modulators of an associated one of the transceivers, for coupling the analog I and Q modulation signals thereto. Coupling means interconnect the analog-to-digital converters (ADCs) of each of the combination digital/analog converters to receive the downconverted I and Q receive signals from the receive I and Q modulators of the associated one of the transceivers. Digital control and processing means are coupled to the analog-to-digital converters (ADCs), and to the digital-to-analog converters (DACs) of the radar system, for generating digital signals representing transmit signals, and for applying the digital signals representing transmit signals to the digital-to-analog converters (DACs) of the radar system in a transmit mode of operation, and for receiving digital signals from the analog-to-digital converters (ADCs) in a receive mode of operation.

In a particularly advantageous arrangement of this radar system. Each of the COTS MMIC transceivers further comprises bandpass filter means coupled to the input ports of the transmit I and Q modulators for filtering the analog I and Q modulation signals applied to the transmit I and Q modulators. In another advantageous arrangement, each of the transceivers further comprises bandpass filter means coupled to the output ports of the receive I and Q modulators for reducing aliasing in the downconverted I and Q receive signals. In a particularly advantageous version, each of the transceivers conforms to at least one of single-band IEEE 802-11 and IEEE 802.11a/g WLAN standards, which latter may be at 2.4 to 2.5 GHz and 4.9 to 5.87 GHz.

When the transmit-receive means is a switch, the switch includes a common port and first and second individual ports, and the digital control and processing means selects between transmit or receive modes of operation, for setting the switches of the system to connect the common port to the first individual port in the transmit mode of operation, and for setting the switch means to connect the common port to the second individual port in the receive mode of operation.

Another system according to an aspect of the invention comprises a network for distribution of clock signals to all elements in the array, so as to enable spatial and temporal coherence of the elements, thereby providing the ability to steer beams and, by steering beams away from undesirable signal sources, to suppress undesirable signals.

A radar apparatus according to an aspect of the invention combines COTS MMIC combination ADC/DACs, COTS MMIC transceivers, COTS power amplifier chips, and supporting power, control, and data I/O on a plurality of like integrated assembly boards. In one version, the apparatus is made up of a plurality of COTS MMIC chips, each of which includes a combination ADC/DAC and transceiver.

DESCRIPTION OF THE INVENTION

Figure 1:
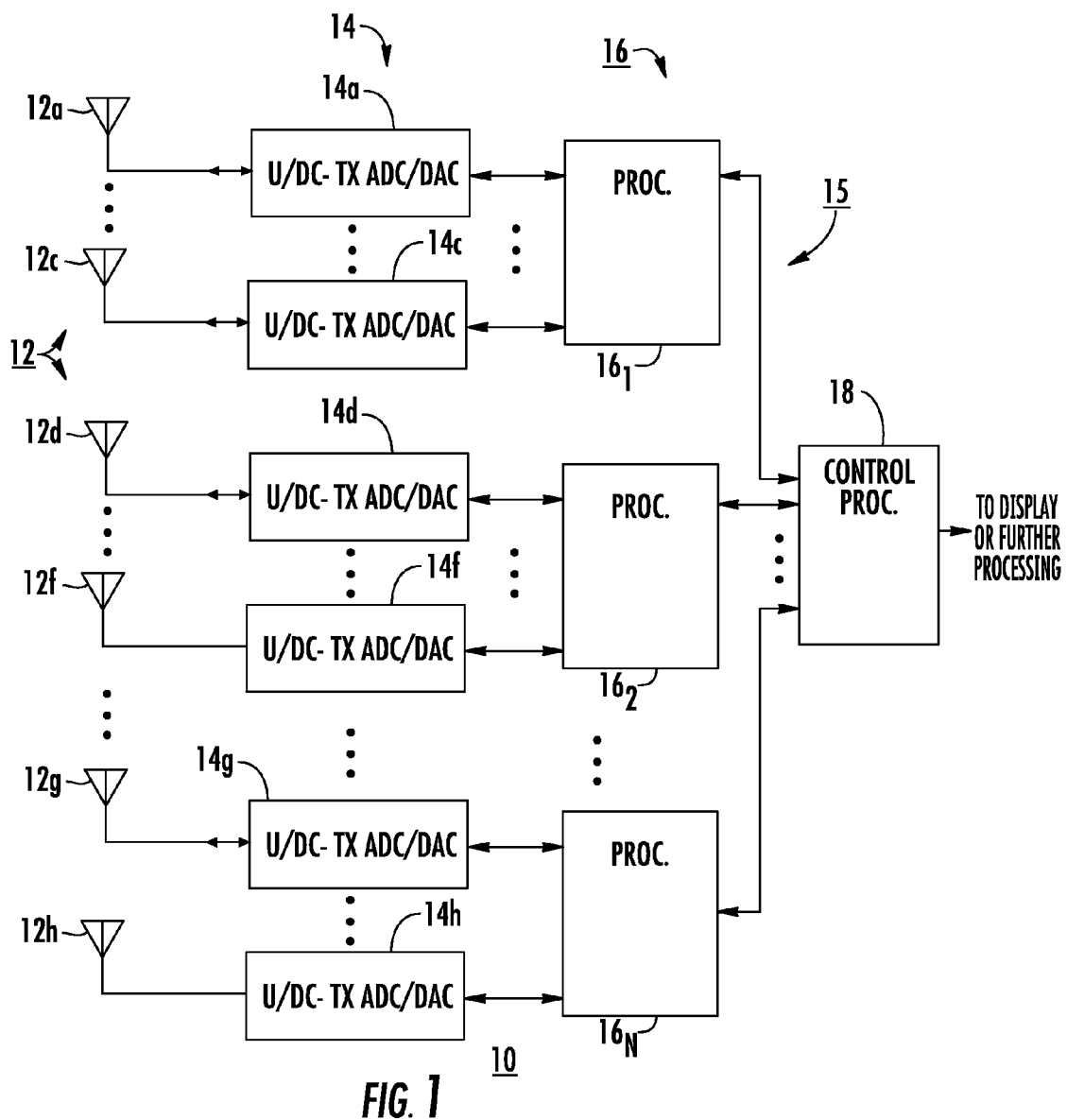
FIG. 1 is a simplified block diagram illustrating a radar system according to an aspect of the invention.

FIG. 1 is a simplified block diagram of a radar system 10 according to an aspect of the invention. In FIG. 1, a set 12 of antenna elements includes plurality of elemental antennas $12a \ldots 12c, 12d \ldots 12f, 12g \ldots 12h$ arranged in an antenna array. Each of antenna elements $12a \ldots 12c, 12d \ldots 12f, 12g \ldots 12h$ is connected by an analog signal path to an associated one of a set 14 of up/downconverter-transceiver ADC/DACs (U/DC-Tx ADC/DACs) $14a, \ldots, 14c, 14d \ldots, 14f, 14g \ldots, 14h$. Each (U/DC-Tx ADC/DAC) of set 14 is in analog communication with the associated elemental antenna of set 12 of antennas, and in digital communication with an associated digital processor. As illustrated in FIG. 1, U/DC-Tx ADC/DACs $14a, \ldots, 14c$ communicate with a processor $16_1$ of a set 16 of digital processors, U/DC-Tx ADC/DACs $14d, \ldots, 14f$ communicate digitally with a processor $16_2$, and U/DC-Tx ADC/DACs $14g, \ldots, 14h$ communicate digitally with a processor $16_N$. Each of the processors of set 16 communicates digitally with a command processor 18.

Figure 2:
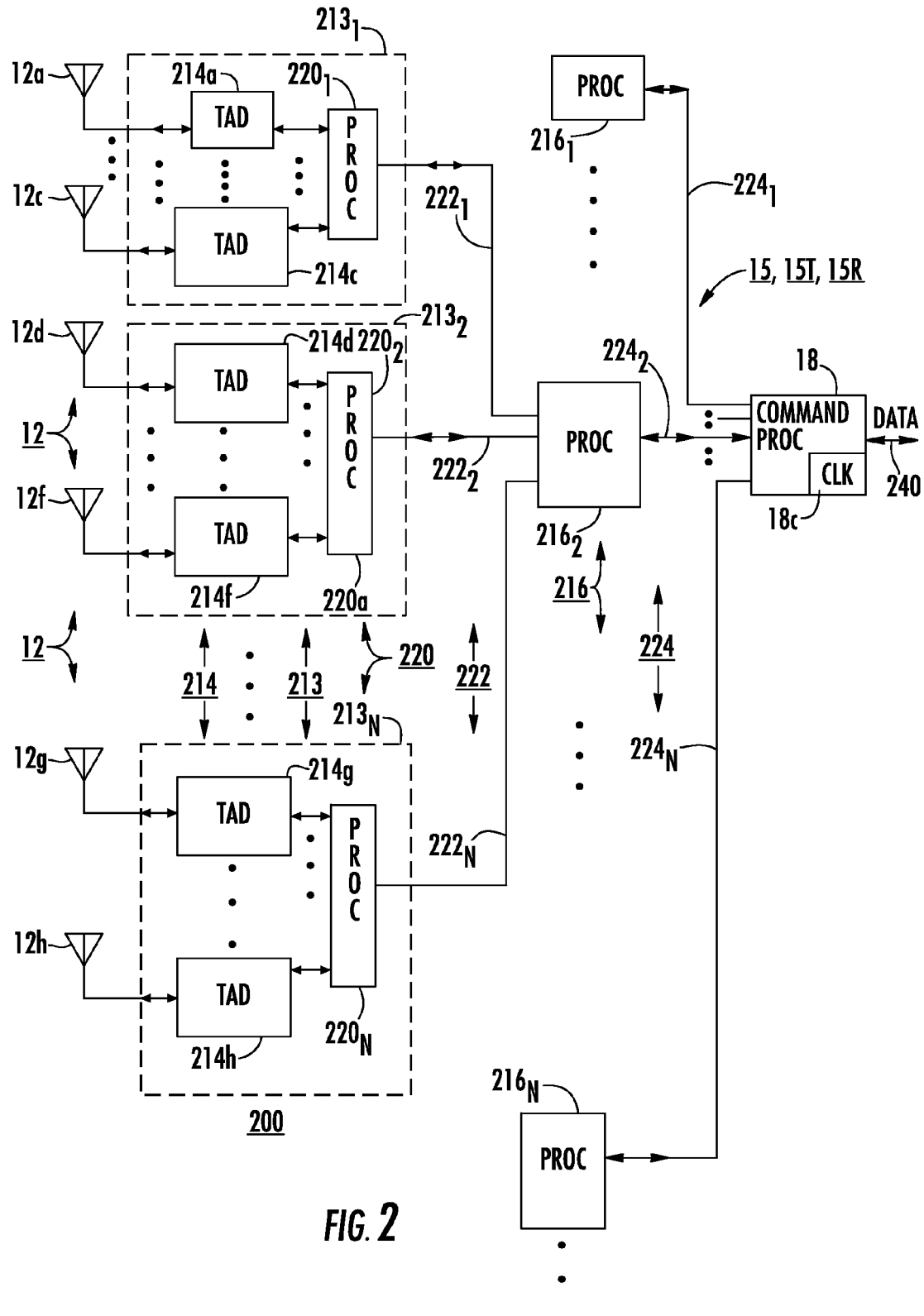
FIG. 2 is a simplified block diagram illustrating a radar system according to an aspect of the invention.

Command processor 18 of FIG. 1 determines or establishes the various parameters or characteristics of the radar signal to be transmitted, such as the timing, carrier frequency, pulse width, pulse length, pulse coding, sidelobe level, steering angle, number of beams, and the like. The digital command signals are transmitted from processor 18 to the various processors of set $16_1$ namely processors $16_1, 16_2, \ldots, 16_N$. Each processor of set 16 of processors receives the command signals and in response generates digital signals which represent the analog signal to be transmitted from each elemental antenna of set 12 of antennas. That is, the digital signals produced by processors of set 14 of processors are digital equivalents of the baseband analog signals to be transmitted from the various elemental antennas of set 12 with which the processors are associated. Thus, processor $16_1$ produces a plurality of individual digital signals, the bits of which represent at least the amplitude and relative phase of the analog signal to be transmitted from the corresponding elemental antennas. The transmit frequency is selected by the control processor, and a control signal is sent to each of the U/DC-Tx units, to command U/D conversion using that RF center frequency. If appropriate, the bits of the digital signal may also directly contain the frequency of the analog signal to be transmitted. It will be clear that the number of digital processors in set 16 of processors depends upon various factors which determine the computational load on the processors and the capabilities of the processors. In principle, all the processors of set 16 and processor 18 can be subsumed into a single processor, which is designated generally as 15. For many applications, more than one processor may be required. Thus, processor 15 as illustrated in FIG. 1 includes portions 15T for controlling transmit functions, and portions 15R for controlling receive functions and processing receive signals, as illustrated in FIG. 2.

In the arrangement of FIG. 1, the digital signals produced by the various processors of set 16 of processors are applied to up/downconverter-transceiver ADC/DACs (U/DC-Tx ADC/DACs) $14a, \ldots, 14c, 14d \ldots, 14f, 14g \ldots, 14h$. That is, each digital signal representing one analog signal to be transmitted by the radar set 10 is applied to one U/DC-Tx ADC/DAC of set 14. For example, a digital signal representing the analog signal to be transmitted by elemental antenna $12a$ is applied from processor $16_1$ to U/DC-Tx ADC/DAC $14a$. U/DC-Tx ADC/DAC $14a$ converts the digital signal to analog, and upconverts the resulting analog signal to the desired operating frequency by means of a transceiver (not illustrated in FIG. 1). The upconverted analog signal is applied to antenna element $12a$. Similarly, U/DC-Tx ADC/DAC $14c$ converts to analog form the digital signal from processor $16_1$, and upconverts the resulting analog signal to the desired operating frequency by means of a transceiver. The upconverted analog signal is applied from U/DC-Tx ADC/DAC $14c$ to elemental antenna $12c$. Likewise, a digital signal representing the analog signal to be transmitted by elemental antenna $12d$ is applied from processor $16_2$ to U/DC-Tx ADC/DAC $14d$. U/DC-Tx ADC/DAC $14d$ converts the digital signal to analog, and upconverts the resulting analog signal to the desired operating frequency by means of a transceiver. The upconverted analog signal produced by U/DC-Tx ADC/DAC $14d$ is applied to elemental antenna $12d$. Similarly, U/DC-Tx-ADC/DAC $14f$ converts the digital signal from processor $16_2$ to analog, and upconverts the resulting analog signal to the desired operating frequency by means of a transceiver. The upconverted analog signal is applied from U/DC-Tx ADC/DAC $14f$ to elemental antenna $12f$. For completeness, a digital signal representing the analog signal to be transmitted by elemental antenna $12g$ is applied from processor $16_3$ to U/DC-Tx ADC/DAC $14g$. U/DC-Tx ADC/DAC $14g$ converts the digital signal to analog, and upconverts the resulting analog signal to the desired operating frequency by means of a transceiver. The upconverted analog signal produced by U/DC-Tx ADC/DAC $14g$ is applied to elemental antenna $12g$. Similarly, U/DC-Tx ADC/DAC $14h$ converts the digital signal from processor $16_3$ to analog, and upconverts the resulting analog signal to the desired operating frequency by means of a transceiver. The upconverted analog signal is applied from U/DC-Tx ADC/DAC 14$h$ to elemental antenna 12$h$.

Thus, in a transmit mode of operation, the radar system 10 of FIG. 1 transmits from each elemental antenna of an antenna array 12 analog signals controllable in amplitude, frequency, relative phase, and modulation characteristics under control of generalized processor 15. By selecting the characteristics of the underlying digital signals to represent plural beams, multiple instantaneous transmit beams can be generated.

In a receive mode of operation of the arrangement of FIG. 1, return or reflected signals from one or more targets (not illustrated) are received at each elemental antenna of set 12 of antennas. The received signals are downconverted in the associated U/DC-Tx ADC/DAC of set 14 of U/DC-Tx ADC/DACs, to thereby generate baseband or possibly intermediate-frequency (IF) signals. The baseband or IF signals are converted into digital form, conserving the amplitude and phase information. The digital data generated by each U/DC-Tx ADC/DAC, representing the analog signal received at the corresponding elemental antenna of set 12 of antennas, is or are applied to the associated processor of set 16 of processors. The individual processors of set 16 of processors process the data to define the various receive beams selected by command processor 18, and to extract the return information from a subarray of antenna elements. Thus, the information extracted by U/DC-Tx ADC/DACs 14$a$, . . . , 14$c$ from the return signals received by antenna subarray 12$a$, . . . , 12$c$ is processed by processor 16$_1$ to produce a portion of the target information. The extracted subarray data from processor 16$_1$ is combined with subarray data from other subarrays in control processor 18, which produces data for display or further processing. Thus, the receive signal processing is performed by generalized processor 15. Multiple simultaneous receive beams are advantageous, as noted in a paper by Merril Skolnik of the Naval Research Laboratory, Washington, D.C. and entitled *ATTRIBUTES OF THE UBIQUITOUS PHASED ARRAY RADAR*, published 2003 by the IEEE.

FIG. 2 is a simplified block diagram of another system according to an aspect of the invention. In the arrangement of FIG. 2, elements corresponding to those of FIG. 1 are designated by like reference numerals. In FIG. 2, a set 12 of arrayed antenna elements includes antenna elements 12$a$ through 12$c$, each of which is connected to a transceiver/ADC/DAC (TAD) arrangement of a set 214 of transceiver/ADC/DAC arrangements 214$a$ through 214$c$. Set 12 of antenna elements also includes antenna elements 214$d$ through 214$f$, which are connected to transceiver/ADC/DAC arrangements 214$d$ through 214$f$, and antenna elements 12$g$ through 12$h$, which are connected to transceiver/ADC/DAC arrangements 214$g$ through 214$h$. Transceiver/ADC/DAC arrangements, 214$a$ through 214$c$, in turn, are connected to a processor 220$_1$, which in one embodiment is a programmable gate array used to interface with and route data to and from the individual TADs 214$a$ through 214$c$. Similarly, transceiver/ADC/DAC arrangements 214$d$ through 214$f$, in turn, are connected to a processor 220$_2$, which is likewise a programmable gate array in one embodiment. For completeness of description, transceiver/ADC/DAC arrangements 214$g$ through 214$h$, in turn, are connected to a processor 220$_3$. The remainder of the arrangement of FIG. 2 is equivalent to that of FIG. 1, except that some of the interconnecting digital data paths are identified by alphanumerics. In one version of this embodiment, the number of elemental antennas 12$a$ through 12$c$ is eight, and the number of TADS 214$a$ through 214$c$ in subassembly or "blade" 213$_1$ (so called because the physical substrate is blade-shaped) is eight. Similarly, the number of elemental antennas 12$d$ through 12$f$ is eight, and the number of TADS in blade 213$_2$ is eight. For completeness, the number of antenna elements 12$g$ through 12$h$ is eight, and the number of TADs in blade 213$_N$ is eight. In FIG. 2, the blades of set 213 are connected to processors of set 216 of processors (of generalized processor 15) by a set of data paths 222, and the processors of set 216 of processors are connected to command processor 18 by a set of data paths 224. More particularly, blades 213$_1$, 213$_2$, . . . , 213$_N$ are connected to processor 216$_2$ by serial data paths 222$_1$, 222$_2$, . . . , 222$_N$, respectively. Processors 216$_1$, 216$_2$, . . . , 216$_N$ are connected to command processor 18 by way of serial data paths 224$_1$, 224$_2$, . . . , 224$_N$ of a set 224 of data paths. In the arrangement of FIG. 2, the generalized processor 15 can be viewed as including processor set 220.

As mentioned, the processors 220$_1$, 220$_2$, . . . , 220$_N$ of set 220 of processors of FIG. 2 interface between their associated transceiver/ADC/DAC arrangements (TADs) of set 214 and buses or network digital paths 222$_1$, 222$_2$, . . . , 222$_N$ of set 222 of serial buses. In both transmit and receive modes of operation of the arrangement of FIG. 2, command processor 18 of generalized processor 15 transmits through the distribution network clock data, transmit/receive mode data, and other housekeeping information. In transmit operation of the arrangement of FIG. 2, each processor 216$_1$, 216$_2$, . . . , 216$_N$ of set 216 of processors receives from command processor 18 commands representing the characteristics of the signal to be transmitted and produces or digitally synthesizes eight baseband waveforms which exhibit the characteristics of pulse width, pulse length, and phase and amplitude relative to that of adjacent elements. The synthesized signals in digital form are transmitted over the bus 222$_1$ to field programmable gate array (FPGA) 220$_1$, over bus 222$_2$ to FPGA 220$_2$, and over bus 222$_N$ to FPGA 220$_N$. FPGAs 220$_1$, 220$_2$, . . . , 220$_N$ parse the digital data, convert from serial to parallel form, and route the data to the appropriate one of TADs of set 214 of TADs. Each TAD then converts the digital data that it receives to analog signal form, and the analog signal is applied to the associated antenna element of set 12 of antenna elements. In one embodiment of the invention, the FPGAs have sufficient processing power to store some of the transmit waveforms in local memory, so that some of the waveforms to be transmitted can be generated locally without involving the higher-level processors of sets 216 or 18.

The individual transceiver/ADC/DACs (TADs) of set 214 of FIG. 2 produce analog signal baseband (or possibly IF) frequency to be transmitted from the transmit digital data, and upconvert the analog baseband signal to the frequency established by the control bits from the processors. The upconverted signals are transmitted from each TAD to an associated antenna or transducer for transmission. The transmitted signals propagate from the antenna elements of set 12 and may impinge upon a target, thereby producing return or reflected signals, as known to those skilled in the art. The reflected signals, if any, return to the radar system 10, where the antenna elements 12$a$, . . . , 12$h$ receive the returned or reflected signals, and couple them to the associated TADs of set 214. Each TAD of set 214 of TADs in the reception mode generates a local oscillator signal based on the clock data distributed from command processor 18. Each TAD of set 214 of TADs downconverts to baseband (or possibly IF) the signal received by its associated antenna element. The baseband signals are converted to parallel digital form within the TADs. The digital data representing the return signals is or are applied to the gate arrays of set 220. The gate arrays of set 220 route the data over the serial buses of set 222 to the processors of set 216 of processors. The processors, when receiving return-signal representative data, apply complex weighting functions to the data from each element and coherently sum the data from each element in a particular direction or directions so as to generate directive receive beams. This process is repeated many times per data set, so that in principle an infinite number of beams with unique characteristics can be formed from a single data set from the TADs. The data is also converted into an output form that is made available on a path 240, to identify the presence or absence of a target and possibly other characteristics of the target(s).

Figure 3:
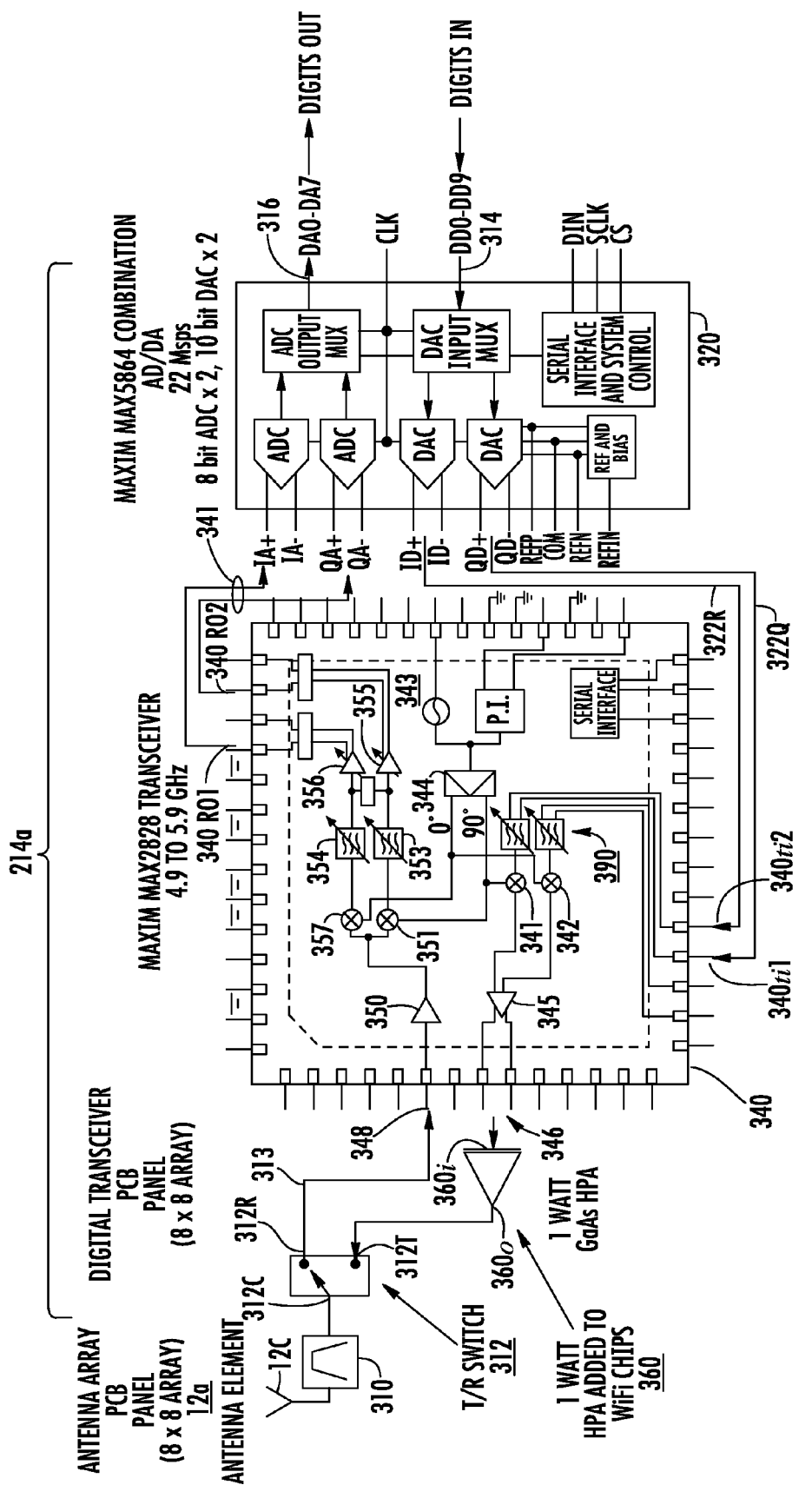
FIG. 3 is a simplified diagram in block and schematic form illustrating a portion of the radar system of FIG. 2.

FIG. 3 is a simplified diagram in block and schematic form illustrating a representative single TAD of FIG. 2, and its interconnections with the associated antenna element. For definiteness, antenna element 12a and TAD 214a are selected as representative. In FIG. 3, TAD 214a includes an analog bandpass filter 310 having a port coupled to antenna element 12a. A second port of filter 310 is connected or coupled to a "common" port 312c of a single-pole, double-throw transmit/receive switch 312. Switch 312 is illustrated by a mechanical switch symbol, as is common for explanatory material. Those skilled in the art realize that solid-state switches are actually used in practice. In the mechanical switch symbol 312, the common port is connected to a movable element illustrated as an arrow, which can connect to one of two individual ports. As illustrated, the movable element of switch 312 is in a position in which the antenna element 12a and filter 310 are coupled through common port 312c to a receive port 312R. In the other position of switch 312, the common port 312c is coupled to a transmit switch port 312T. The transmit or receive state of switch 312 is controlled digitally with commands originating from command processor 18 of FIG. 1 or 2.

In the arrangement of FIG. 3, digital data representing the analog signals to be transmitted are applied by way of Digits In path 314 to a clocked combination analog-to-digital and digital-to-analog converter (AD/DA) 320. In the particular embodiment illustrated in FIG. 3, AD/DA 320 is a Maxim MAX5864 monolithic mixed-signal integrated circuit (MMIC), which is a commercial off-the-shelf device (COTS). A mixed-signal device operates on both digital and analog signals. The serial digital data to be transmitted is applied to AD/DA 320, and multiplexed within AD/DA 320 to produce mutually quadrature-phase data. Two digital-to-analog converters (DACs) separately convert the digital data into analog form. The inphase (I) (or real) and quadrature (Q) (or imaginary) components of the resulting analog signal are generated at analog signal ports ID+ and QD+, and carried on signal paths 322R and 322Q, respectively, for application to a solid-state transceiver 340. In the particular embodiment of FIG. 3, the transceiver 340 is a Maxim type MAX2828 integrated circuit, also a MMIC COTS device. Both the AD/DA 312 and transceiver 340 are commercial off-the-shelf (COTS) items which are designed for Wi-Fi wireless local area network data communications. Wi-Fi is a name coined by the Wireless Ethernet Compatibility Alliance for equipment interoperable with IEEE standard 802.11.

Transceiver 340 of FIG. 3 has a pair of transmit analog signal input ports 340ti1 and 340ti2, which couple the transmit analog signals (by way of antialias filters) to a pair of mixers or multipliers (X) 341 and 342. Clock data to establish a frequency reference is or are applied to a phase-lock loop designated generally as 343. Multipliers 341 and 342 also receive reference-frequency signals from phase-lock loop 343 by way of a phase shifter 344 to provide the mixers 341 and 342 with mutually quadrature reference signals. The application of the reference signals at or near the desired upconverted frequency causes the mixers to operate as upconverters, producing carrier signal modulated by the commanded functions. The upconverted signals produced by mixers 341 and 342 are applied to an amplifier 345, which amplifies the upconverted carrier signal. The amplified upconverted carrier signal appears at a transmit signal output port set 346 of transceiver 340. The amplified upconverted carrier signal appearing at output port set 346 of transceiver 340 can be amplified, if desired, before application to the transmit individual port 312T of transmit/receive switch 312. In the particular embodiment of FIG. 3, a COTS 1-watt amplifier is coupled to the Wi-Fi transceiver 340 to provide greater transmit power than that provided by the transmit signal amplifier 345 of the transceiver integrated circuit 340. Such an amplifier preferably uses GaAs transistors at the present state of the art.

In operation of the arrangement of a radar system using elements corresponding to that of FIG. 3, the command processor 18 of FIG. 1 or 2 selects the transmission mode, and sets switch 312 to the transmit mode. Command processor 18 also selects a time for transmission of radar signals, and the various parameters of the signal to be transmitted. The command processor 18 sends digital data representing this information to the lower-level processors, which respond to the commands by generating digital representations of the analog signals to be transmitted, including, if appropriate, a plurality of transmit beams to be formed by the antenna array. The digital data is applied to the digital-to-analog converters (DACS) of AD/DA integrated circuit 320, which generates the corresponding analog signal. The analog signal to be transmitted is sent to the upconverters 341, 342 of transceiver integrated circuit 340, and amplified by amplifier 345. The signal from amplifier 345 is further amplified by power amplifier 360. The amplified signals from amplifier 360 are applied through switch 312 in its transmit mode of operation, through bandpass filter 310 to the antenna element. Bandpass filter 310 is selected to suppress unwanted frequency sidebands and components which are artifacts of the upconversion process.

The radar system incorporates many structures such as that of FIG. 3. The command processor 18 of FIGS. 1 and 2 establishes the characteristics of the signals which are transmitted from each of the elemental antennas of set or array 12 of antennas, in such a manner as to define the transmit beam or beams and their steering direction, beam width, sidelobe levels, inserted nulls, and the like. The signals transmitted by the various elemental antennas of set 12 of antennas "combine in space" to produce the desired radiation pattern.

In the presence of one or more targets within the transmitted beam of electromagnetic energy, reflections can be expected to occur. When reflections occur, they propagate in various directions, and some of the reflected energy returns to the radar system. By the time reflected energy has returned to the radar system, the command processor 18 of FIGS. 1 and 2 will have commanded all of the transmit/receive switches 312 to assume the receive state, in which the common port 312c is coupled to the receive individual port 312R. Returned electromagnetic signal is picked up or received by each of the various antenna elements of set 12, including representative antenna element 12a of FIG. 3. The energy received by antenna element 12a is coupled through bandpass filter 310 to the common port of switch 312, and thence to receive individual port 312R. From switch 312, the received signal energy is coupled to a receive signal port 348 of transceiver 340.

The received signal energy coupled to receive signal port 348 of FIG. 3 is applied to the input port of a low-noise amplifier 350 to produce amplified return or reflected signal.

The amplified return signal is applied to a downconverter including multipliers (X) 351 and 352. Multipliers 351 and 352 also receive the same reference carriers that are applied to upconverter multipliers 341 and 342, in the same quadrature relationship. Multipliers 351 and 352 downconvert the received signal to produce inphase (I) and quadrature (Q) baseband return signals. The downconverted signal may deviate from exact baseband (or IF frequency) as a result of Doppler shifts imposed on the return signal. The I and Q baseband return signals are filtered 353, 354 to reduce intermodulation products, and amplified 355, 356 to produce baseband analog return I and Q signals at transceiver return signal output ports 340Ro1 and 340Ro2.

The baseband analog return I and Q signals at transceiver return signal output ports 340Ro1 and 340Ro2 are coupled to analog I and Q signal input ports IA+ and QA+, respectively, of AD/DA 320. The return analog I and Q signals are individually applied to ADCs of AD/DA 320, to thereby produce digital signals representing the return analog I and Q signals. The digital data produced by the ADCs of AD/DA 320 are applied to a multiplexer for putting the data in serial form for transmission to the next stage of processing.

It is desirable to coherently sum the signals transmitted from the various elemental antennas in the transmission mode of operation, and to coherently sum the received signals, in a manner that defines the desired antenna beams on transmission and reception, respectively. To enable the coherent summation of signals from all of the array elements, the digital data transmitted from, or received by, each antenna element must be "generated" or processed in a manner that maintains phase alignment of the signals from each element. This is achieved by distributing a reference clock to the transceiver of each element, and more particularly to the phase-lock loop 343. In one embodiment of a radar according to an aspect of the invention, the reference clock is at 160 MHz. This distribution is accomplished, in part, by generating the desired clock signal, or at least digital signals representing the desired clock signal, within command processor 18 of FIG. 2, as for example by means of a CLK generator 18c. A distribution network including the data paths of set 224, processors of set 216 of processors, and the data paths of set 222, distributes to each blade of set 213 of blades, and within each blade, provides this clock signal to each transceiver of set 14 of transceivers. The distribution network enables a single reference clock signal to be power divided (or replicated) and distributed to each transceiver with only a small delta phase component from element to element. The transceivers use this signal in a phase lock loop circuit to generate intermediate frequencies which are mixed with RF and baseband frequencies to generate baseband and RF frequencies, respectively.

FIG. 3 and the description herein are simplified to make the main operation clear. Those skilled in the art will understand that the AD/DA 320 and the transceiver 340 require power supplies, reference supplies, and various control functions, and other support, and know what to provide and how to provide it.

Figure 4:
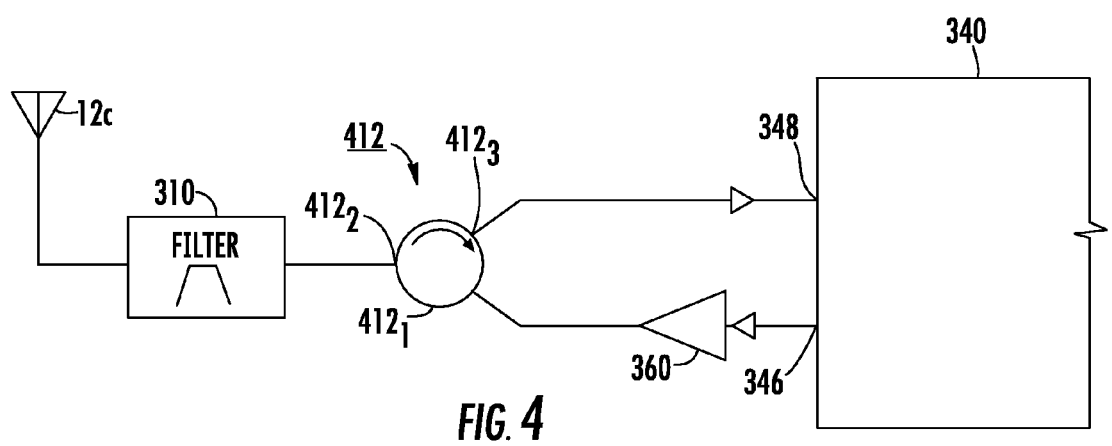
FIG. 4 is a simplified diagram in block and schematic form illustrating the use of a circulator rather than a switch in the radar system of FIG. 2.

FIG. 4 is a simplified block diagram of a portion of a radar system according to another embodiment of the invention. In the portion of FIG. 4, elements corresponding to those of FIG. 2 are designated by the same alphanumeric. FIG. 4 differs from the arrangement of FIG. 2 in that the transmit/receive switch 312 is replaced by a circulator 412. In the arrangement of FIG. 4, circulator 412 includes a first port 412$_1$, which connects to the output of power amplifier 360 (or directly to output port 346 of transceiver chip 340, if desired). Signals to be transmitted are coupled from amplifier 360 to port 412$_1$, and are circulated in the direction of the indicating arrow to port 412$_2$. The signals to be transmitted exit port 412$_2$ and flow to the filter 310 and antenna element 12c. Signals received by antenna element 12c are coupled through filter 310 to circulator port 412$_2$, and are circulated to port 412$_3$. The received signals exit port 412$_3$ and are coupled to receive signal input port 348 of transceiver chip 340. Circulators are well known in the art and require no further description. Use of circulators rather than switches reduces the need to generate and distribute transmit/receive switch control signals.

Figure 5:
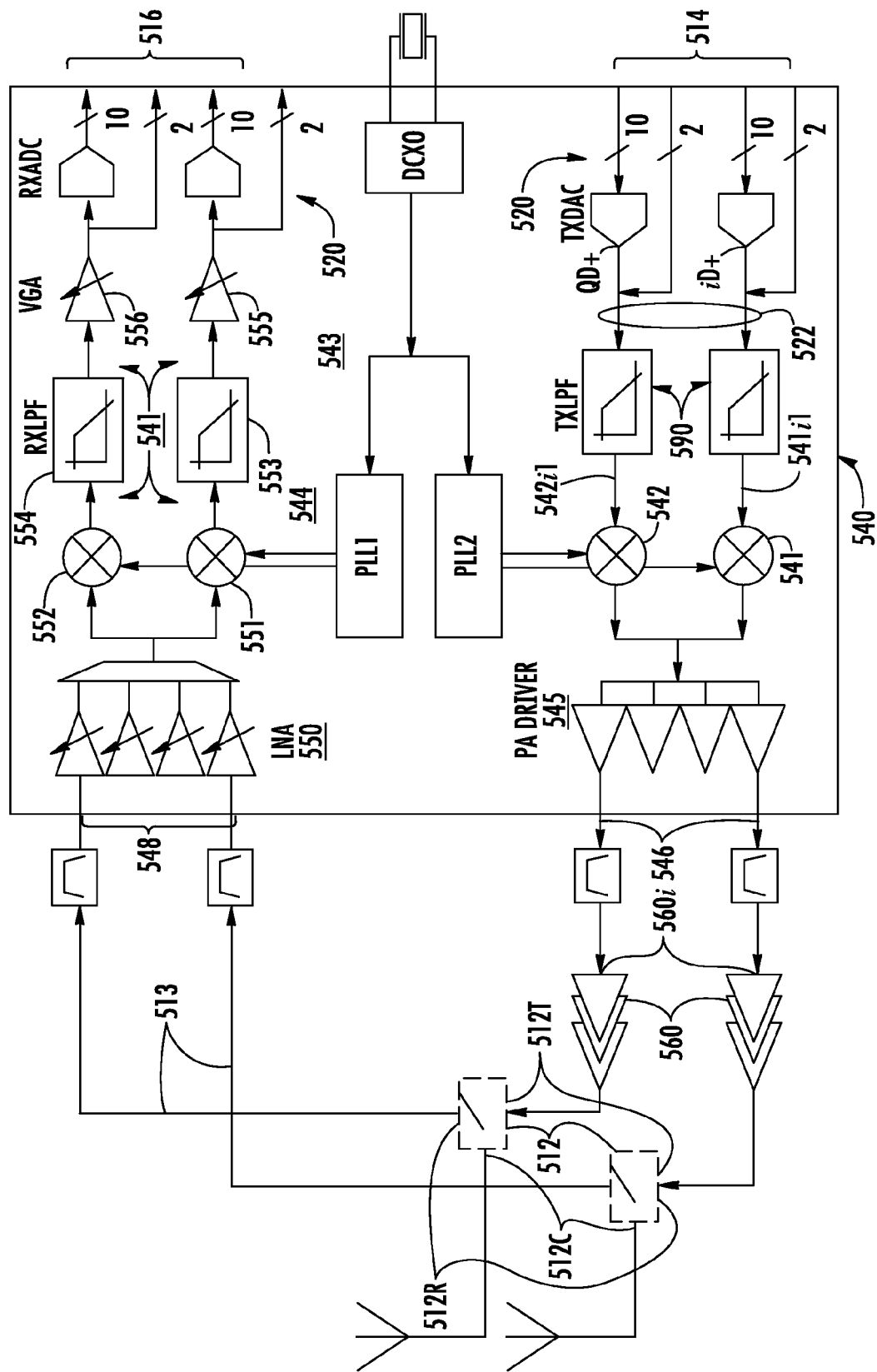
FIG. 5 is a simplified diagram in block and schematic form illustrating another type of monolithic microwave integrated circuit which can be used in the radar of FIG. 2.

FIG. 5 is a simplified diagram in block and schematic form taken from an application note for type COTS MMIC AA1001 wideband RFIC transceiver 540 pursuant to WiMax (IEEE 802.16) standards, and thus is compatible with the 802.11 standard. This solid-state or MMIC transceiver differs from that of FIG. 3 in that it incorporates the digital-to-analog (RXADC) and analog-to-digital (TXDAC) converters within the same device. This eliminates the need for a separate chip. The AA100L also differs in that it is capable selectively operating at multiple frequency bands. The AA1001 is usable in the same manner as the combination of the Maxim MAX2828 transceiver with the Maxim MAX5864 AD/DA. The salient difference between these two embodiments, of course, is that only one MMIC chip, namely the combined transceiver/AD/DA 540, is needed to perform all the digital-to-analog processing, transceiving, and analog-to-digital processing, Those skilled in the art will recognize that the AA1001 should receive the reference signal at the DCXO port illustrated as connected to a crystal symbol, and that other modifications may be required. Thus, the arrangement of FIG. 5 may be viewed as including the combined functions of transceiving and AD/DA conversion on a single chip.

Other embodiments of the invention will be apparent to those skilled in the art. For example, while the buses have been described as being serial, they may be parallel, or a mixture of serial and parallel. Where the term "port" or the like is used, it will be understood that multiple connections may be contemplated, as in the case of I and Q components of a signal.

A radar (10, 200) system according to an aspect of the invention comprises a first plurality of arrayed elemental antennas (12a-12h) forming an array (12) and a plurality, equal in number to the first plurality, of digital transmitting signal generating means (15T). The radar system (10, 200) also includes a plurality, equal in number to the first plurality, of receive digital signal processing means (15R) and a plurality, equal in number to the first plurality, of MMIC combination digital-to-analog and analog-to-digital conversion means (320), each digital-to-analog conversion means (DAC) including a digital input port (314) and an analog output port (ID+, QD+), and each analog-to-digital conversion means (ADC) including an analog input port (IA+, QA+) and a digital output port (316). The radar system (10, 200) further includes a plurality, equal in number to the first plurality, of MMIC transceivers (340;540), each of the MMIC transceivers (340;540) including (a) a transmit analog signal input port (340$ti$1, 340$ti$2) coupled to an upconverter (341, 342) for upconverting analog signals to be transmitted, a transmit amplifier (345) coupled to the upconverter (341, 342) for receiving upconverted signals to be transmitted and for generating at an analog transmit signal output port (346) analog signals to be transmitted and (b) an analog receive signal input port (348) coupled to a receive amplifier (350) for generating amplified receive signals, and a downconverter (351, 352) coupled for receiving the amplified receive signals, for generating at an analog receive signal output port (340Ro1, 340Ro2) downconverted analog receive signals. The radar system (10, 200) also includes means (220, 222, 224) for coupling each of the digital transmitting signal generating means (15T) to the digital input port (314) of a corresponding one of the digital-to-analog conversion means (DAC), whereby analog transmit signals appear at the analog output port (ID+, QD+) of the digital-to-analog conversion means (DAC). Means (322R, 322Q) are provided for coupling the analog output port (ID+, QD+) of each of the digital-to-analog conversion means (DAC) to the analog transmit signal input port (340$ti$1, 340$ti$2) of a corresponding one of the transceivers (340;540), whereby analog signals to be transmitted are generated at the analog transmit signal output port (346). A plurality, equal in number to the first plurality, of transmit-receive switches (312) are provided. Each of the switches (312) includes a common port and also includes individual transmit (312T) and receive (312R) ports, with the common port (312$c$) of each of the transmit-receive switches (312) being coupled to a corresponding elemental antenna (12$c$) of the array (12). The radar system (10, 200) further includes means (312) for coupling the analog transmit signal output port (346) of each of the transceivers (340;540) to a corresponding transmit port (312T) of a corresponding one of the switches (312), whereby, when the corresponding one of the switches (312) is conditioned for transmission, coupling the analog signals to be transmitted from the analog transmit signal output port (346) of the corresponding transceiver (340; 540) to the corresponding elemental antenna (12$c$) of the array (12). Means (313) are provided for coupling the receive signal port of (312R) each of the transmit-receive switches (312) to the analog receive signal input port (348) of the corresponding one of the transceivers (340; 540), thereby, when the corresponding one of the switches (312) is conditioned for reception, coupling receive signals from the corresponding one of the elemental antennas (12$a$-12$h$) to the analog receive signal output port (340Ro1, 340Ro2) of the corresponding one of the transceivers (340;540). Means (341) are also provided for coupling the analog receive signal output port (340Ro1, 340Ro2) of the corresponding one of the transceivers (340; 540) to the analog input port (IA+, QA+) of the corresponding one of the combination digital-to-analog and analog-to-digital conversion means (320), whereby digital receive signals are generated at the digital output port (316) of the combination digital-to-analog and analog-to-digital conversion means (320). Means (220, 222, 224) are further provided for coupling the digital output port (316) of the combination digital-to-analog and analog-to-digital conversion means (320) to the receive digital signal processing means (15R). Radar (10, 200) control means (15) are coupled to the digital transmitting signal generating means (15T), to the receive digital signal processing means (15R), and to the switches (312), for controlling the digital transmitting signal generating means (15T) for generating transmit signals during those intervals in which the switch means (312) are conditioned for transmission, and for controlling the digital signal processing means (15R) during those intervals in which the switch means (312) are conditioned for reception.

In a particular embodiment of this system, the common port (312$c$) of each of the transmit-receive switches (312) is coupled to a corresponding elemental antenna (12$c$) of the array (12) by means of a filter (310), which may be a bandpass filter. In an especially advantageous version or arrangement according to an aspect of the invention, each of the transceivers (340; 540) conforms to at least single-band IEEE 802-11 WLAN standards. In another advantageous version, each of the transceivers (340; 540) conforms to dual-band 802.11a/g standards at 2.4 to 2.5 GHz and 4.9 to 5.87 GHz.

A radar system (10, 200) according to another aspect of the invention comprises an array (12) including a first plurality of antenna elements (12$a$-12$h$), and a plurality, equal in number to the first plurality, of transmit-receive means (312, 412), each of the transmit-receive means (312, 412) including a common port (312$c$, 412$_2$) and first (312T; 412$_1$) and second (312R; 412$_2$) individual ports, the common port (312$c$; 412$_2$) of each of the transmit-receive means (312, 412) being coupled to an associated antenna element (12$c$) of the array (12) of antenna elements. The transmit-receive means may be a controllable switch or a circulator. In this system, a plurality, equal in number to the first plurality, of COTS MMIC transceivers (340; 540) chips are provided, each of the transceivers (340; 540) chips comprising a transmit channel (341, 342, 345; 541, 542, 545), a receive channel (350, 351, 352; 550, 551, 552), and a transmit-frequency oscillator or reference signal source (343; 543) for producing transmit-frequency signals. The transmit channel (341, 342, 345; 541, 542, 545) comprises I and Q transmit modulators (341, 342; 541, 542) defining I and Q input ports (340$ti$1, 340$ti$2; 541$i$1, 541$i$1), each of the I and Q transmit modulators (341, 342; 541, 542) being coupled to receive mutually-quadrature-phase versions of the transmit-frequency signals at the input ports (340$ti$1, 340$ti$2; 541$i$1, 541$ti$) of the I and Q transmit modulators (341, 342; 541, 542), for generating upconverted I and Q transmit signals at the transmit frequency. The transmit channel further comprises a transmit amplifier (345; 545) coupled to output ports of the transmit I and Q modulators (341, 342; 541, 542) for generating amplified transmit signals. The transmit amplifier (345; 545) may be differential. The receive channel (350, 351, 352; 550, 551, 552) comprises a receive amplifier (350; 550) and receive I and Q modulators (351, 352; 551, 552). Each of the receive I and Q modulators (351, 352; 551, 552) includes an input port coupled to the receive amplifier (350; 550) for receiving amplified receive signal therefrom. Each of the receive I and Q modulators (351, 352; 551, 552) is coupled to receive mutually-quadrature-phase versions (by way of PLL1 &2, 544) of the transmit-frequency signals for generating downconverted I and Q receive signals at output ports of the receive I and Q modulators (351, 352; 551, 552). The receive channel (350, 351, 352; 550, 551, 552) further includes amplifying means (355, 356; 555, 556) for amplifying the downconverted I and Q receive signals. A plurality, equal in number to the first plurality, of COTS MMIC power amplifiers (360; 560) is provided, each of the power amplifiers (360; 560) including an input port (360$i$; 560$i$) coupled to the output port (346; 546) of the transmit amplifier (345; 545) of an associated one of the transceivers (340; 540) chips and an output port coupled to the first individual port (312$c$ 412$_2$; 512$c$) of an associated one of the transmit-receive means (312, 412, 512). Coupling means (313; 513) are coupled to the second individual port (312R, 412$_3$, 512R) of an associated one of the transmit-receive means (312, 412, 512) and to the input port (348; 548) of the receive amplifier (350, 550), for coupling analog received signal to the receive amplifier (350, 550). A plurality, equal in number to the first plurality, of COTS MMIC combination digital/analog converters chips (320; 520) is provided. Each of the combination digital/analog chips converters (320, 520) includes digital-to-analog (DAC) converters coupled to receive (at 314; 514) digital control signals, for converting the digital control signals into corresponding analog I and Q modulation signals. Each of the combination digital/analog chips converters (320; 520) further includes analog-to-digital conversion means (ADCs), for converting applied analog I and Q signals into corresponding digital signals. Coupling means (ID+, QD+) interconnect the digital-to-analog converters (DACs) of each of the combination digital/analog converters chips (320; 520) with the transmit I and Q modulators (341, 342; 541, 542) of a associated one of the transceivers (340; 540) chips, for coupling the analog I and Q modulation signals thereto. Coupling means (341; 541) interconnect the analog-to-digital converters (ADCs) of each of the combination digital/analog converters (320; 520) chips to receive the downconverted I and Q receive signals from the receive I and Q modulators (351, 352; 551, 552) of the associated one of the transceivers (340; 540) chips. Digital control and processing means (15) are coupled to the analog-to-digital converters (ADCs), and to the digital-to-analog converters (DACs) of the radar (10, 200) system, for generating digital signals representing transmit signals, and for applying the digital signals representing transmit signals to the digital-to-analog converters (DACs) of the radar (10, 200) system in a transmit mode of operation, and for receiving digital signals from the analog-to-digital converters (ADCs) in a receive mode of operation.

In a particularly advantageous arrangement of this radar system. Each of the COTS MMIC transceivers (340; 540) chips further comprises bandpass filter means (390; 590) coupled to the input ports of the transmit I and Q modulators (341, 342; 541, 542) for filtering the analog I and Q modulation signals applied to the transmit I and Q modulators (341, 342; 541, 542). In another advantageous arrangement, each of the transceivers (340; 540) chips further comprises bandpass filter means (353, 354; 553, 554) coupled to the output ports of the receive I and Q modulators (351, 352; 551, 552) for reducing aliasing in the downconverted I and Q receive signals. In a particularly advantageous version, each of the transceivers (340; 540) chips conforms to at least one of single-band IEEE 802-11 and IEEE 802.11a/g WLAN standards, which latter may be at 2.4 to 2.5 GHz and 4.9 to 5.87 GHz.

When the transmit-receive means is a switch, the switch includes a common port and first and second individual ports, and the digital control and processing means selects between transmit or receive modes of operation, for setting the switches of the system to connect the common port to the first individual port in the transmit mode of operation, and for setting the switch means to connect the common port to the second individual port in the receive mode of operation.

Another system according to an aspect of the invention comprises a network for distribution of clock signals to all elements in the array, so as to enable spatial and temporal coherence of the elements, thereby providing the ability to steer beams and, by steering beams away from undesirable signal sources, to suppress undesirable signals.

A radar (10, 200) apparatus according to an aspect of the invention combines COTS MMIC combination ADC/DACs, COTS MMIC transceivers (340;540), COTS power amplifier chips, and supporting power, control, and data I/O on a plurality of like integrated assembly boards (set 213). In one version, the apparatus is made up of a plurality of COTS MMIC chips, each of which includes a combination ADC/DAC and transceiver.

What is claimed is:

1. A radar system, comprising:
   a first plurality of arrayed elemental antennas forming an array;
   a plurality, equal in number to said first plurality, of digital transmitting signal generating means;
   a plurality, equal in number to said first plurality, of receive digital signal processing means;
   a plurality, equal in number to said first plurality, of MMIC combination digital-to-analog and analog-to-digital conversion means, each digital-to-analog conversion means including a digital input port and an analog output port, and each analog-to-digital conversion means including an analog input port and a digital output port;
   a plurality, equal in number to said first plurality, of MMIC transceivers, each of said MMIC transceivers including (a) a transmit analog signal input port coupled to an upconverter for upconverting analog signals to be transmitted, a transmit amplifier coupled to said upconverter for receiving upconverted signals to be transmitted and for generating at an analog transmit signal output port analog signals to be transmitted and (b) an analog receive signal input port coupled to a receive amplifier for generating amplified receive signals, and a downconverter coupled for receiving said amplified receive signals, for generating at an analog receive signal output port downconverted analog receive signals;
   means for coupling each of said digital transmitting signal generating means to said digital input port of a corresponding one of said digital-to-analog conversion means, whereby analog transmit signals appear at said analog output port of said digital-to-analog conversion means;
   means for coupling the analog output port of each of said digital-to-analog conversion means to the analog transmit signal input port of a corresponding one of said transceivers, whereby analog signals to be transmitted are generated at said analog transmit signal output port;
   a plurality, equal in number to said first plurality, of transmit-receive switches, each of said switches including a common port and also including individual transmit and receive ports, said common port of each of said transmit-receive switches being coupled to a corresponding elemental antenna of said array;
   means for coupling said analog transmit signal output port of each of said transceivers to a corresponding transmit port of a corresponding one of said switches, whereby, when said corresponding one of said switches is conditioned for transmission, coupling the analog signals to be transmitted from said analog transmit signal output port of the corresponding transceiver to the corresponding elemental antenna of said array;
   means for coupling said receive signal port of each of said transmit-receive switches to said analog receive signal input port of said corresponding one of said transceivers, thereby, when said corresponding one of said switches is conditioned for reception, coupling receive signals from said corresponding one of said elemental antennas to said analog receive signal output port of said corresponding one of said transceivers;
   means for coupling said analog receive signal output port of said corresponding one of said transceivers to said analog input port of said corresponding one of said combination digital-to-analog and analog-to-digital conversion means, whereby digital receive signals are generated at said digital output port of said combination digital-to-analog and analog-to-digital conversion means;
   means for coupling said digital output port of said combination digital-to-analog and analog-to-digital conversion means to said receive digital signal processing means;
   radar control means coupled to said digital transmitting signal generating means, to said receive digital signal processing means, and to said switches, for controlling said digital transmitting signal generating means for generating transmit signals during those intervals in which said switches are conditioned for transmission, and for controlling said digital signal processing means during those intervals in which said switches are conditioned for reception.

2. A system according to claim 1, wherein said common port of each of said transmit-receive switches is coupled to a corresponding elemental antenna of said array by means of a filter.

3. A system according to claim 2, wherein each of said filters is a bandpass filter.

4. A system according to claim 1, wherein each of said transceivers conforms to at least single-band 802-11 WLAN standards.

5. A system according to claim 1, wherein each of said transceivers conforms to dual-band 802.11a/g standards at 2.4 to 2.5 GHz and 4.9 to 5.87 GHz.

6. A radar system, comprising:

an array including a first plurality of antenna elements;

a plurality, equal in number to said first plurality, of transmit-receive means, each of said transmit-receive means including a common port and first and second individual ports, said common port of each of said transmit-receive means being coupled to an associated antenna element of said array of antenna elements;

a plurality, equal in number to said first plurality, of COTS MMIC transceivers, each of said transceivers comprising a transmit channel, a receive channel, and a transmit-frequency oscillator for producing transmit-frequency signals, said transmit channel comprising I and Q transmit modulators defining I and Q input ports, each of said transmit I and Q modulators being coupled to receive mutually-quadrature-phase versions of said transmit-frequency signals at said input ports of said I and Q transmit modulators, for generating upconverted I and Q transmit signals at said transmit frequency, said transmit channel further comprising a transmit amplifier coupled to output ports of said I and Q transmit modulators for generating amplified transmit signals, said receive channel comprising a receive amplifier and receive I and Q modulators, each of said receive I and Q modulators including an input port coupled to said receive amplifier for receiving amplified receive signal therefrom, each of said receive I and Q modulators being coupled to receive mutually-quadrature-phase versions of said transmit-frequency signals for generating downconverted I and Q receive signals at output ports of said receive I and Q modulators, said receive channel further including amplifying means for amplifying said downconverted I and Q receive signals;

a plurality, equal in number to said first plurality, of COTS MMIC power amplifiers, each of said power amplifiers including an input port coupled to said output port of said transmit amplifier of an associated one of said transceivers and an output port coupled to said first individual port of an associated one of said transmit-receive means;

coupling means coupled to said second individual port of an associated one of said transmit-receive means and to said input port of said receive amplifier, for coupling analog received signal to said receive amplifier;

a plurality, equal in number to said first plurality, of combination digital/analog converters, each of said combination digital/analog converters including digital-to-analog converters coupled to receive digital control signals, for converting said digital control signals into corresponding analog I and Q modulation signals, each of said combination digital/analog converters further including analog-to-digital conversion means, for converting applied analog I and Q signals into corresponding digital signals;

coupling means interconnecting said digital-to-analog converters of each of said combination digital/analog converters with said transmit I and Q modulators of a associated one of said transceivers, for coupling said analog I and Q modulation signals thereto; and coupling means interconnecting said analog-to-digital converters of each of said combination digital/analog converters to receive said downconverted I and Q receive signals from said receive I and Q modulators of the associated one of said transceivers;

digital control and processing means coupled, to said analog-to-digital converters, and to said digital-to-analog converters of said radar system, for generating digital signals representing transmit signals, and for applying said digital signals representing transmit signals to said digital-to-analog converters of said radar system in a transmit mode of operation, and for receiving digital signals from said analog-to-digital converters in a receive mode of operation.

7. A system according to claim 6, wherein said transmit amplifier is a differential amplifier.

8. A system according to claim 6, wherein each of said transceivers further comprises:

bandpass filter means coupled to said input ports of said transmit I and Q modulators for filtering said analog I and Q modulation signals applied to said transmit I and Q modulators.

9. A system according to claim 6, wherein each of said transceivers further comprises:

bandpass filter means coupled to said output ports of said receive I and Q modulators for reducing aliasing in said downconverted I and Q receive signals.

10. A system according to claim 6, wherein each of said transceivers conforms to at least single-band 802-11 WLAN standards.

11. A system according to claim 6, wherein each of said transceivers conforms to dual-band 802.11a/g standards at 2.4 to 2.5 GHz and 4.9 to 5.87 GHz.

12. A system according to claim 6, wherein said transmit-receive means comprises a circulator.

13. A system according to claim 6, wherein said transmit-receive means comprises:

transmit-receive switch means including a common port and first and second individual ports; and said digital control and processing means selects between transmit or receive modes of operation, for setting said switch means to connect said common port to said first individual port in the transmit mode of operation, and for setting said switch means to connect said common port to said second individual port in the receive mode of operation.

14. A system according to claim 6, further comprising a network for distribution of clock signals to all elements in the array, so as to enable spatial and temporal coherence of said elements, thereby providing the ability to steer beams and, by steering beams away from undesirable signal sources, to suppress undesirable signals.

15. A system according to claim 6, wherein:

each of said combination digital/analog converters is a monolithic integrated circuit separate from that one of said COTS MMIC transceivers to which it is electrically connected.

16. A system according to claim 6, wherein:
each of said combination digital/analog converters is monolithically integral with that one of said COTS MMIC transceivers to which it is electrically connected.

17. A radar system, comprising:
an array including a first plurality of antenna elements;
a plurality, equal in number to said first plurality, of transmit-receive means, each of said transmit-receive means including a common port and first and second individual ports, said common port of each of said transmit-receive means being coupled to an associated antenna element of said array of antenna elements;
a plurality, equal in number to said first plurality, of COTS transceiver/AD/DA chips, each of said transceiver/AD/DA chips comprising a transmit channel, a receive channel, and a transmit-frequency oscillator for producing transmit-frequency signals, said transmit channel comprising I and Q transmit modulators defining I and Q input ports, each of said transmit I and Q modulators being coupled to receive mutually-quadrature-phase versions of said transmit-frequency signals at said input ports of said I and Q transmit modulators, for generating upconverted I and Q transmit signals at said transmit frequency, said transmit channel further comprising a transmit amplifier coupled to output ports of said transmit I and Q modulators for generating amplified transmit signals, said receive channel comprising a receive amplifier and receive I and Q modulators, each of said receive I and Q modulators including an input port coupled to said receive amplifier for receiving amplified receive signal therefrom, each of said receive I and Q modulators being coupled to receive mutually-quadrature-phase versions of said transmit-frequency signals for generating downconverted I and Q receive signals at output ports of said receive I and Q modulators, said receive channel further including amplifying means for amplifying said downconverted I and Q receive signals;
each of said transceiver/AD/DA chips further including digital-to-analog converters coupled to receive digital control signals, for converting said digital control signals into corresponding analog I and Q modulation signals, each of said combination digital/analog chips further including analog-to-digital conversion means, for converting applied analog I and Q signals into corresponding digital signals;
each of said transceiver/AD/DA chips further including coupling means interconnecting said digital-to-analog converters with said transmit I and Q modulators of the associated transceiver/AD/DA chip, for coupling said analog I and Q modulation signals thereto, and coupling means interconnecting said analog-to-digital converters to receive said downconverted I and Q receive signals from said receive I and Q modulators of the associated transceiver/AD/DA chip;
a plurality, equal in number to said first plurality, of COTS power amplifiers, each of said power amplifiers including an input port coupled to said output port of said transmit amplifier of an associated one of said transceiver chips and an output port coupled to said first individual port of an associated one of said transmit-receive means;

coupling means coupled to said second individual port of an associated one of said transmit-receive means and to said input port of said receive amplifier, for coupling analog received signal to said receive amplifier; and
digital control and processing means coupled to said analog-to-digital converters and to said digital-to-analog converters of said radar system, for generating digital signals representing transmit signals, and for applying said digital signals representing transmit signals to said digital-to-analog converters of said radar system in a transmit mode of operation, and for receiving digital signals from said analog-to-digital converters in a receive mode of operation.

18. A radar system, comprising:
a first plurality of arrayed elemental antennas forming an array;
a plurality, equal in number to said first plurality, of digital transmitting signal generators;
a plurality, equal in number to said first plurality, of receive digital signal processors;
a plurality, equal in number to said first plurality, of MMIC combination digital-to-analog and analog-to-digital converters, each digital-to-analog converter including a digital input port and an analog output port, and each analog-to-digital converter including an analog input port and a digital output port;
a plurality, equal in number to said first plurality, of MMIC transceivers, each of said MMIC transceivers including (a) a transmit analog signal input port coupled to an upconverter for upconverting analog signals to be transmitted, a transmit amplifier coupled to said upconverter for receiving upconverted signals to be transmitted and for generating at an analog transmit signal output port analog signals to be transmitted and (b) an analog receive signal input port coupled to a receive amplifier for generating amplified receive signals, and a downconverter coupled for receiving said amplified receive signals, for generating at an analog receive signal output port downconverted analog receive signals;
an arrangement for coupling each of said digital transmitting signal generators to said digital input port of a corresponding one of said digital-to-analog converters, whereby analog transmit signals appear at said analog output ports of said digital-to-analog converters;
an arrangement for coupling the analog output port of each of said digital-to-analog converters to the analog transmit signal input port of a corresponding one of said transceivers, whereby analog signals to be transmitted are generated at said analog transmit signal output port;
a plurality, equal in number to said first plurality, of transmit-receive switches, each of said switches including a common port and also including individual transmit and receive ports, said common port of each of said transmit-receive switches being coupled to a corresponding elemental antenna of said array;
an arrangement for coupling said analog transmit signal output port of each of said transceivers to a corresponding transmit port of a corresponding one of said switches, whereby, when said corresponding one of said switches is conditioned for transmission, coupling the analog signals to be transmitted from said analog transmit signal output port of the corresponding transceiver to the corresponding elemental antenna of said array;
an arrangement for coupling said receive signal port of each of said transmit-receive switches to said analog receive signal input port of said corresponding one of said transceivers, thereby, when said corresponding one of said switches is conditioned for reception, coupling receive signals from said corresponding one of said elemental antennas to said analog receive signal output port of said corresponding one of said transceivers;

an arrangement for coupling said analog receive signal output port of said corresponding one of said transceivers to said analog input port of said corresponding one of said combination digital-to-analog and analog-to-digital converters, whereby digital receive signals are generated at said digital output port of said combination digital-to-analog and analog-to-digital converters;

an arrangement for coupling said digital output port of said combination digital-to-analog and analog-to-digital converters to said receive digital signal processors;

a radar controller coupled to said digital transmitting signal generators, to said receive digital signal processors, and to said switches, for controlling said digital transmitting signal generators for generating transmit signals during those intervals in which said switches are conditioned for transmission, and for controlling said digital signal processors during those intervals in which said switches are conditioned for reception.

\* \* \* \* \*